US008918866B2

(12) United States Patent
Luo et al.

(10) Patent No.: US 8,918,866 B2
(45) Date of Patent: Dec. 23, 2014

(54) ADAPTIVE RULE LOADING AND SESSION CONTROL FOR SECURING NETWORK DELIVERED SERVICES

(75) Inventors: Lin Luo, Beijing (CN); Vugranam C. Sreedhar, Yorktown Heights, NY (US); Shun X. Yang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1393 days.

(21) Appl. No.: 12/493,356

(22) Filed: Jun. 29, 2009

(65) Prior Publication Data

US 2010/0333167 A1    Dec. 30, 2010

(51) Int. Cl.
*H04L 29/06*    (2006.01)

(52) U.S. Cl.
CPC ............ *H04L 63/1441* (2013.01); *H04L 63/20* (2013.01)
USPC ............................................. 726/22; 713/187

(58) Field of Classification Search
USPC .......................................... 726/1, 22; 713/187
See application file for complete search history.

(56) References Cited

U.S. PATENT DOCUMENTS

| | | | |
|---|---|---|---|
| 5,819,033 A | | 10/1998 | Caccavale |
| 6,779,119 B1 | | 8/2004 | Moshfeghi et al. |
| 6,865,426 B1 | | 3/2005 | Schneck et al. |
| 2004/0250124 A1* | 12/2004 | Chesla et al. ................. 713/201 |
| 2006/0015715 A1* | 1/2006 | Anderson ..................... 713/154 |
| 2006/0090198 A1* | 4/2006 | Aaron .............................. 726/6 |
| 2006/0137009 A1* | 6/2006 | Chesla ............................ 726/22 |
| 2006/0253902 A1* | 11/2006 | Rabadan et al. ................ 726/13 |
| 2007/0180490 A1 | 8/2007 | Renzi et al. |
| 2007/0180527 A1* | 8/2007 | Yeom ............................... 726/23 |
| 2008/0168561 A1* | 7/2008 | Durie et al. ..................... 726/23 |
| 2008/0172419 A1* | 7/2008 | Richards et al. ............. 707/200 |

OTHER PUBLICATIONS

Zhang, Yu, et al. "Adaptive Rule Loading and Session Control for Securing Web-Delivered Services." Services-I, 2009 World Conference on. IEEE, 2009. APA.*
Ma, Zhanfei, and Xuefeng Zheng. "Multi-layer intrusion detection and defence mechanisms based on immunity." Genetic and Evolutionary Computing, 2008. WGEC'08. Second International Conference on. IEEE, 2008.*
Singh, Aameek et al., "Security vs. Performance: Tradeoffs using a Trust Framework", IEEE, 13th NASA Goddard Conference on Mass Storage Systems and Technologies (MSST'05), 2005, 8 pages.

* cited by examiner

*Primary Examiner* — Christopher Brown
*Assistant Examiner* — Harris Wang
(74) *Attorney, Agent, or Firm* — Stephen J. Walder, Jr.; Preston J. Young

(57) ABSTRACT

Mechanisms are provided for handling client computing device requests with adaptive rule loading and session control. The mechanisms partition a set of rules, into a plurality of filter sets with each filter set having a different subset of the set of rules and being directed to identifying a different type of attack on a backend application or service. A subset of filter sets is selected to be used to validate client computing device requests received from client computing devices. The selected filter sets are applied to requests and/or responses to requests. The mechanisms dynamically modify which filter sets are included in the subset of filter sets based on an adaptive reinforcement learning operation on results of applying the selected filter sets to the requests and/or responses to requests.

13 Claims, 8 Drawing Sheets

```xml
<SaaSValidation>

<loadstrategy>
<enabledfilters>f1/f3/f4</enabledfilters>           — 491
</loadstrategy>
<concurrentsession>20</concurrentsession>           — 492

<filterchain>                                        — 493
<filter name="f1"  class="validate.filter.whitelist" />
<filter name="f2"  class="validate.filter.protocol" />
<filter name="f3"  class="validate.filter.XSS" />
<filter name="f4"  class="validate.filter.cmdinject" />
<filter name="f5"  class="validate.filter.outbound" />
<filter name="f6"  class="validate.filter.integrity" />
<filter name="f7"  class="validate.filter.trojans" />
</filterchain>

<filterset id="f1"  type="whitelist">                — 494, 495
<ruleset path="/purchase/orderquery.jsp">
<rule>
<name>ordername</name>                               — 496
<constraint cstOpt="regex">safetext</constraint>    — 497
<actionlist reason="malformed"  severity="fatal">   — 498
<action class="validate.action.log"/>               — 499
<action class="validate.action.drop"/>
</actionlist>
</rule>
</ruleset>
</filterset>

<filterset id="f4"  type="cmdinject">
<ruleset>
<rule>
<name>PARAMS</name>
<constraint cstOpt="regex">fileinject</constraint>
<actionlist reason="cmdinject"  severity="fatal">
<action class="validate.action.log"/>
<action class="validate.action.drop"/>
</actionlist>
</rule>
</ruleset>
</filterset>

</SaaSValidation>
...        ...        ...        ...
```

*FIG. 4B*

ADAPTIVE RULE LOADING AND SESSION CONTROL FOR SECURING NETWORK DELIVERED SERVICES

BACKGROUND

The present application relates generally to an improved data processing apparatus and method and more specifically to mechanisms for providing adaptive rule loading and session control for securing network delivered services.

Many organizations are facing unprecedented challenges in ensuring that their websites are secure and perform well. With the growing trend to deliver software as a service (SaaS), attackers are having more motivation to penetrate such websites to steal valuable business information. A SaaS provider hosts several SaaS applications, including competing customers' applications, and these applications sometimes share the same resources, such as databases or file systems. Thus, there is a potential for malicious attacks, or attempts to steal information, such as from client computing devices targeting particular service provider applications, or even from one service provider application to another service provider application. Moreover, there is a potential for even unintentional accessing of sensitive information from a service provider application, such as a request from a client computing device unintentionally access information for a different service provider application than was intended due to the shared resources of the provider.

There are a number of ways in which security of SaaS providers, and other service providers, may be breached either intentionally or unintentionally. For example, a malicious party may use cross-site scripting. Structured Query Language (SQL) injection, cross site request forgery, or the like. Cross site scripting (XSS) is a type of computer security vulnerability typically found in web applications which allow code injection by malicious web users into the web pages viewed by other users. Examples of such code include HTML code and client-side scripts. An exploited cross-site scripting vulnerability can be used by attackers to bypass access controls such as the same origin policy. Vulnerabilities of this kind have been exploited to craft powerful phishing attacks and browser exploits. Often during an XSS attack everything looks fine to the end-user who may be subject to unauthorized access, theft of sensitive data, and financial loss.

SQL injection is a code injection technique that exploits a security vulnerability occurring in the database layer of an application. The vulnerability is present when user input contains SQL statements or user input is not strongly typed and thereby unexpectedly executed. It is an instance of a more general class of vulnerabilities that can occur whenever one programming or scripting language is embedded inside another.

Cross site request forgery (CSRF), also known as a one-click attack or session riding, is a type of malicious exploit of a website whereby unauthorized commands are transmitted from a user that the website trusts. CSRF is a form of confused deputy attack in which an attacker confuses or tricks an end user to load a page that contains a malicious request. The malicious request inherits the identity and privileges of the end user to perform an undesired function on the user's behalf, such as accessing bank accounts. CSRF attacks generally target functions that cause a state change on the server (such as money transfer) or to access sensitive data (such as stealing an end user's personal information).

Because of these, and many other types of attacks on websites, that can potentially damage websites, website providers and web service providers are adding more and more sophisticated defense mechanisms to protect their assets, e.g., more and more filters that filter malicious inputs. However, adding more defense mechanisms often negatively impacts the performance of the websites hosting the SaaS applications. That is, more processing of inputs and outputs is necessary as each layer of security is added which in turn causes a reduction in the throughput and responsiveness of the provider and, ultimately, the websites and web services hosted by the provider.

SUMMARY

In one illustrative embodiment, a method, in a data processing system, is provided for handling client computing device requests. The method comprises partitioning a set of rules, stored in a storage device of the data processing system, into a plurality of filter sets. Each filter set comprises a different subset of the set of rules and is directed to identifying a different type of attack on a backend application or service. The method further comprises selecting, by a processor of the data processing system, one or more filter sets, in the plurality of filter sets, to be used to validate client computing device requests received from client computing devices. The one or more filter sets is less than a total number of the filter sets in the plurality of filter sets. Moreover, the method comprises applying, by the processor, the one or more selected filter sets to at least one client computing device request or at least one response to a client computing device request. Additionally, the method comprises dynamically modifying, by the processor, which filter sets of the plurality of filter sets that are included in the one or more selected filter sets, based on an adaptive reinforcement learning operation on results of applying the one or more selected filter sets to at least one client computing device request or at least one response to a client computing device request.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4B is an example diagram illustrating an example implementation of a filter set in accordance with one illustrative embodiment;

DETAILED DESCRIPTION

Figure 1:
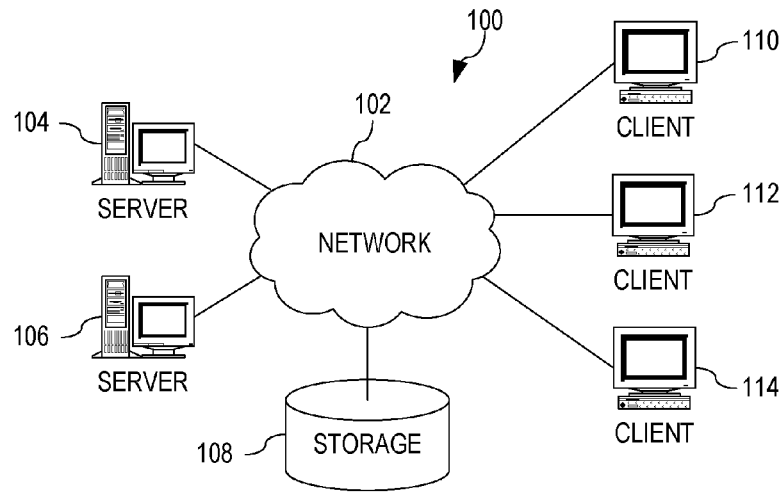
FIG. 1 is a pictorial representation of an example distributed data processing system in which aspects of the illustrative embodiments may be implemented.

The illustrative embodiments provide a mechanism for providing adaptive rule loading and session control for securing network delivered services. The mechanisms of the illustrative embodiments operate to balance an application or service provider's need for security with their need for reducing the system costs introduced by security enhancing measures. The balancing of these competing interests is performed dynamically, or adaptively, based on interactions with the particular applications, services, or resources being protected by the security mechanisms.

The mechanisms of the illustrative embodiments provide an adaptive reinforcement learning control technique for intrusion checking. A validation rule-based model is designed to describe the requirement of vulnerability detection. The rule-based model is defined as a formal policy that describes the security requirements of an application/service provider, the rule-based model including the validation rules and session control rules for providing the security requirements. The validation rule model is based on regular expressions, which includes white list (positive) patterns to regulate user inputs, and black list (negative) patterns to define the vulnerability signatures, such as cross-site scripting (XSS), HTTP response splitting, SQL injection, and the like. Moreover, the rule-based model provides the input value verification to prevent parameter tampering and CSRF attack, and the outbound information checking to prevent information leakage.

A primary set of rules is generated during the development, testing, and deployment phases of an application/service. A runtime protection mechanism, which uses a session listener (such as a HyperText Transfer Protocol (HTTP) session listener) and filters, intercepts requests and responses. Based on the rule set, a rule engine is implemented to generate the violation reports which can be used to evaluate and update the rule set during the runtime phase of operation.

The whole validation rule set is divided into multiple sections, with each section being able to be enabled/disabled in either in-line control mode or off-line monitoring mode based on the observation and analysis of user behaviors, thereby balancing security and system cost. Since patterns of user inputs to an application/service can change dynamically, an adaptive reinforcement learning technique is used to dynamically adjust the session control under different sizes of in-line validation rules, thereby maintaining the response time in an acceptable level as well as maximizing the utilization of system resources.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
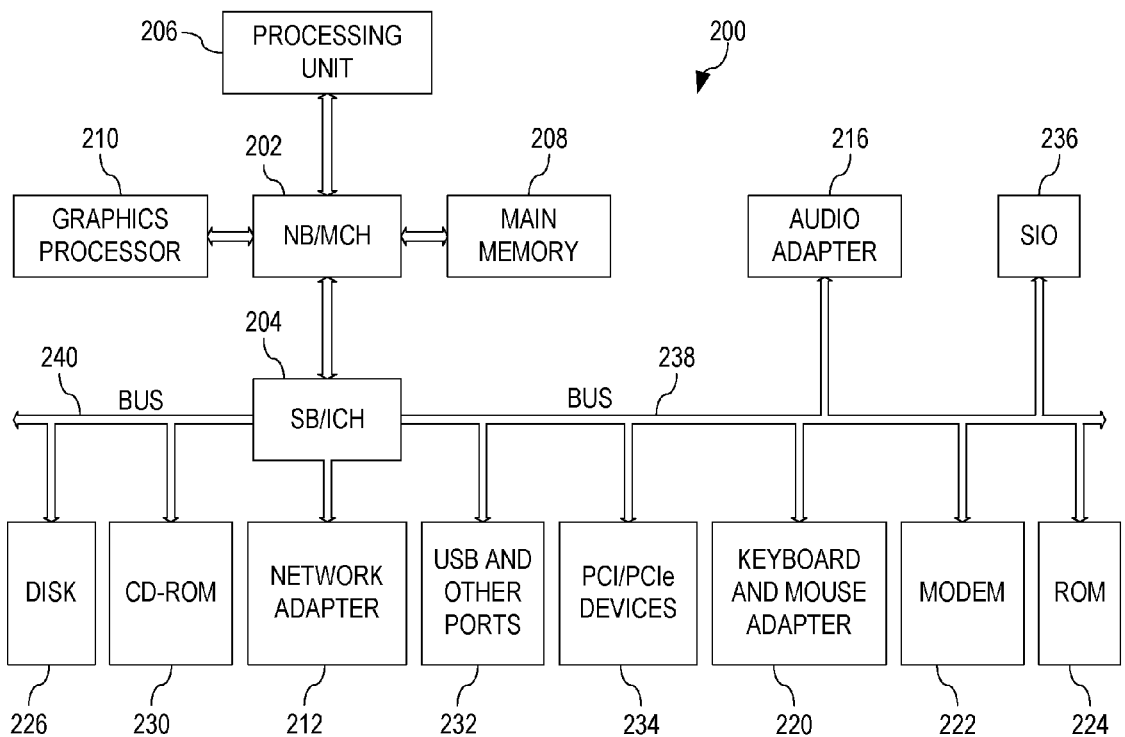
FIG. 2 is a block diagram of an example data processing system is shown in which aspects of the illustrative embodiments may be implemented.

The illustrative embodiments, being directed to security of application or service providers, are especially well suited for use in a distributed data processing environment having at least one application server or service provider server, at least one client computing device, and at least one data network coupling the at least one application server or service provider server with the at least one client computing device. In order to provide a context for the description of the specific elements and functionality of the illustrative embodiments. FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures. FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above. FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With the mechanisms of the illustrative embodiments, one or more of the servers 104 or 106 in FIG. 1 provide one or more applications, services, or the like, to one or more client devices, such as clients 110-114. For example, in one illustrative embodiment, the servers 104 and 106 may be software as a service (SaaS) providers. The server, e.g., either server 104 or 106, implements the mechanisms of the illustrative embodiments to balance security of the various applications, services, or the like, provided by the server with the costs of providing such applications, services, etc. in terms of the server resources required to provide such security, e.g., processor and memory usage requirements, which negatively affect response time for client requests from client computing devices 110-114.

Figure 3:
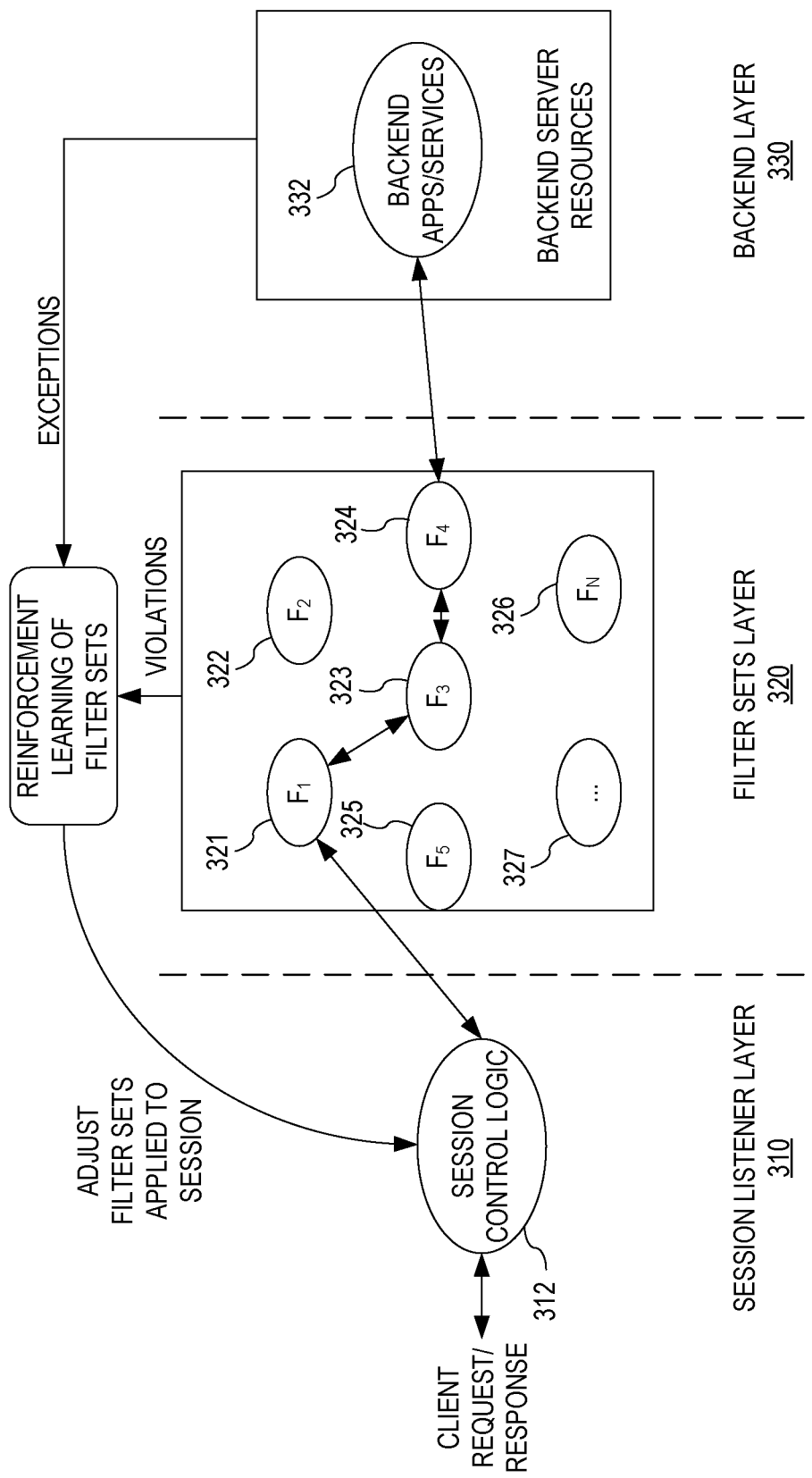
FIG. 3 is an example block diagram illustrating a high level concept of the mechanisms of the illustrative embodiments.

FIG. 3 is an example block diagram illustrating a high level concept of the mechanisms of the illustrative embodiments. As shown in FIG. 3, the illustrative embodiments provide a session listener layer 310 and filter set layer 320 of protection prior to arriving at the existing backend layer 330. The session listener layer 310 includes session control logic 312. The session control logic 312 initializes a session between a client computing device and one or more of the applications/services 332 in the back-end layer 330. The session control logic 312 may further associate a session control number with the session for purposes of adaptively modifying session controls applied to the established session as described in greater detail hereafter. A security administrator may establish an initial inline filter set or set(s), which may be applied to client requests/responses by the session control logic 312, and which may then be dynamically adapted according to the detected interactions with the backend applications/services 332, as described hereafter. The session control logic 312 may further tear down a session once the session is complete.

The filter set layer 320 comprises a plurality of filters that are organized or partitioned into a plurality of filter sets 321-327. Each filter set 321-327 corresponds to an attack type for which that filter set 321-327 is specifically designed to detect and prevent. For example, a first filter set 321 may be a whitelist for a particular back-end application/service 332 which specifies patterns for user inputs that are approved for accessing the backend application/service 332. The whitelist essentially contains a list of input patterns to implement server-side checking for user input values, which can reduce the false negatives of any blacklists utilized. A second filter set 322 may be associated with a detecting and preventing HyperText Transport Protocol (HTTP) violations by checking if a request violates the HTTP protocol, determining if an argument is too large, etc. The second filter set 322 regulates HTTP usage to prevent application layer attacks.

A third filter set 323 may be a blacklist for client-side attacks which checks vulnerabilities for one or more of XSS, Adobe PDF XSS. HTTP response splitting, or the like, which specifies patterns of user inputs that take advantage of such vulnerabilities. A fourth filter set 324 may be a blacklist for command injection that checks for requests that attempt to take advantage of vulnerabilities of the backend layer 330 to LDAP, SSI, PHP, SQL, Email, or file injection. A fifth filter set 325 may be an outbound information leakage filter set that may be used to identify information that should not be leaked by including such information in responses to client requests. A sixth filter set 326 may be directed to detecting integrity violations, such as via parameter tamper detection or the like. Still other filter sets 327 may be used to detect other types of inputs attempting to take advantage of vulnerabilities of various other types, e.g., detection of Trojan horse attacks or the like.

The filter sets 321-327 may each be comprised of one or more filter rules. The filter sets 321-327 may be independently activated, such as by dynamic rules loading logic of the illustrative embodiments described hereafter, for application to a particular session between a client computing device and the backend applications/services 332. Initially, certain ones of the filter sets 321-327 may be "turned on" and others may be "turned off" in accordance with an initial filter set determination made by the dynamic rules loading logic of the illustrative embodiments. A filter set being "turned on" means that the filter set is enabled for application to a particular session while a filter set being "turned off" means that the filter set is disabled and is not applied to the particular session.

The determination as to which filter sets 321-327 are to be "turned on" and "turned off" may be made based on a session control configuration data structure which may be dynamically updated. Thus, initially, a certain subset of the filter sets 321-327, which is less than the total number of filter sets 321-327, are determined to be applicable to client requests and backend application/services 332 responses based on a session control configuration data structure. Alternatively, all of the filter sets 321-327 may be initially utilized with the number of filter sets 321-327 being used for subsequent requests or sessions with the same client computing device being reduced in accordance with the results of reinforcement learning as described hereafter.

A client request for access to a backend application/service 332 is received in the session control logic 312 which then passes the client request through the filter sets 321-327 that have been turned on, e.g., filters sets 321, 323, and 324 in the depicted example. Assuming that the client request passes all of the filter sets 321, 323, and 324. i.e. does not contain inputs identified by the filter sets 321, 323, and 324 that indicate a need to filter out the client request, the client request is passed on to the backend application/service 332 that was targeted by the client request. If, however, the client request meets a criteria in one or more of the filter sets 321, 323, and 324, that indicates that the client request should be filtered out and not provided to the backend application/service 332, the client request is filtered out by the corresponding filter set 321, 323, or 324 and a violation may be generated and used to perform reinforcement learning of the filter sets to be applied to client requests for the session or future sessions with the client computing device.

Those client requests that pass the filter sets 321-327 and are provided to the targeted backend application/service 332 may still contain inputs or content that, while passing the criteria of the filter sets 321-327, cause a problem to occur in the backend application/service 332. In such a case, the backend application/service 332 may generate an exception that is handled by a corresponding exception handler within the backend server layer 330. The exception may, like the violation generated by the filter set layer 320, be used to perform reinforcement learning of the filter sets that are to be applied to the session or future sessions with the client computing device. That is, the violations generated by various ones of the "turned-on" filter sets 321, 323, and 324 generating the violations provide positive reinforcement for the "turned-on" filter sets in that the violations indicate that the filter sets 321, 323, and 324 are operating properly to filter out potentially malicious client request inputs. The exceptions generated by the application/service 332 provide a negative reinforcement in that they indicate that the filter sets 321, 323, and 324 have not filtered out the particular client request input that caused the exception. In such a case, a determination may be made as to whether there are other filter sets that can be turned on to address this type of client request input or a new rule set may be automatically generated to address this client request input. That is, in the event that there are no other filter sets that can be turned on to address the cause of the exception, then the exception, the input causing the exception, and the like, may be used to automatically generate a new rule/filter set to identify an input that will lead to a reoccurrence of the exception if not filtered, and then enable this new rule/filter set so that such an input will generate a violation and will not be passed to the backend applications/services 332 in the future.

The reinforcement learning of filter sets is performed based on the violations and exceptions, as well as other information regarding accesses to the backend applications/services 332, to determine how well the current subset of filter sets 321, 323, and 324 are handling client requests submitted to the backend applications/services 332. Based on this analysis, the reinforcement learning causes updates or modifications to the filter sets 321-327 "turned on" for a particular client session, for future client sessions from the same client computing device, for current or future sessions from any client computing device to particular backend applications/services 332.

Figure 4A:
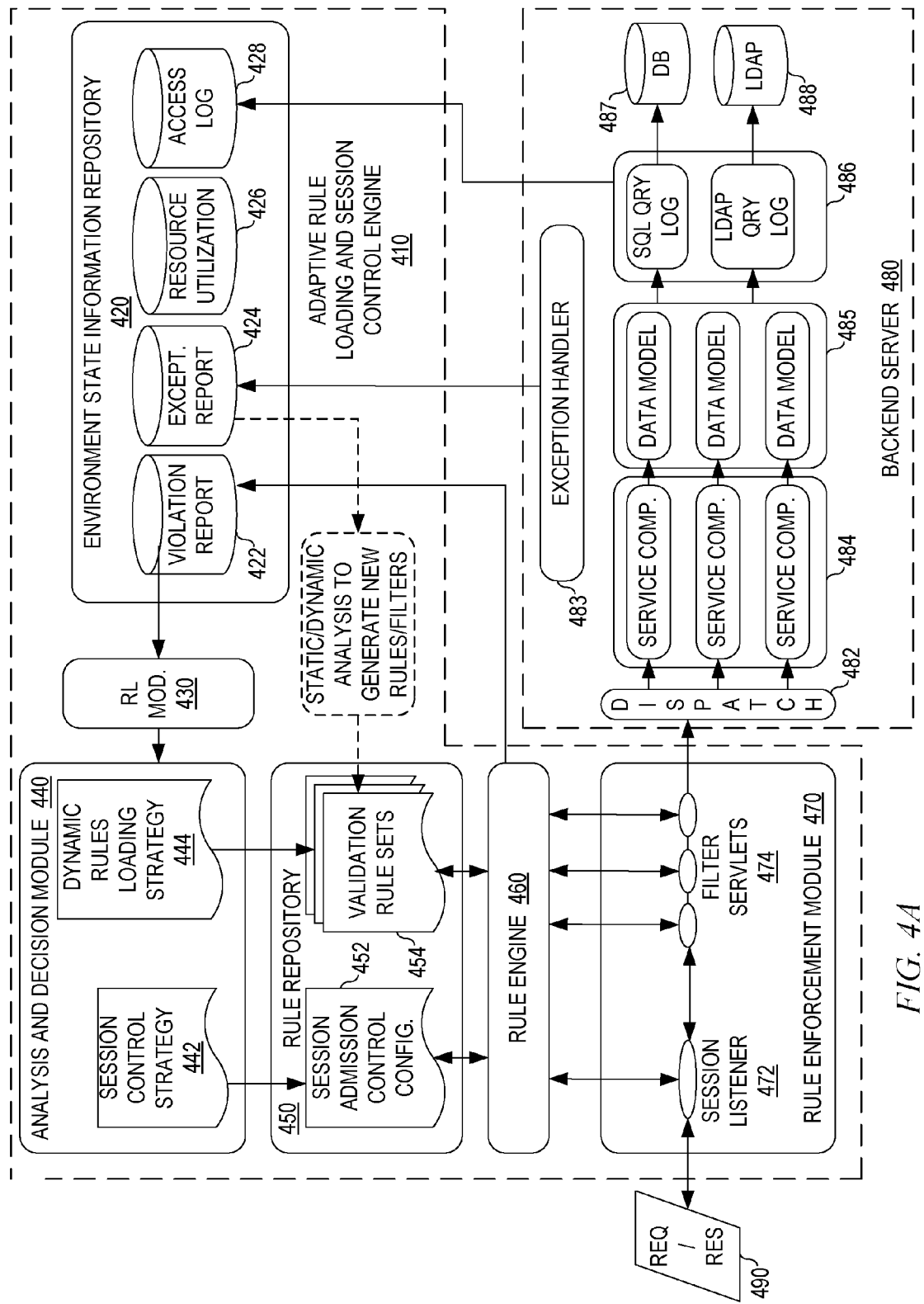
FIG. 4A is an exemplary block diagram of an adaptive rule loading and session control engine in accordance with one illustrative embodiment.

FIG. 4A is an exemplary block diagram of an adaptive rule loading and session control engine in accordance with one illustrative embodiment. The elements shown in FIG. 4A may be implemented in hardware, software, or any combination of hardware and software. In one illustrative embodiment, the elements shown in FIG. 4A are implemented as software executing on one or more data processing devices.

As shown in FIG. 4A, the adaptive rule loading and session control engine 410 comprises six main modules or engines. These six main modules or engines comprise a rule engine 460, rule enforcement module 470 (including session listener 472 and filter servlets 474), rule repository 450 (including session admission control configuration rules 452 and validation rule sets 454), analysis and decision module 440, reinforcement learning (RL) module 430, and environment state information repository 420. The adaptive rule loading and session control engine 410 interacts with the backend server 480 to provide client computing device requests, as part of a session between the client computing device and one or more applications/services 484 hosted by the backend server 480, to the backend server 480 and provide responses to those requests back to the client computing device. While FIG. 4 only shows the interaction between the adaptive rule loading and session control engine 410 being in one direction, i.e. From the client computing device to the backend server 480, this is done to better describe the reinforcement learning performed by the mechanisms of the illustrative embodiments and it should be appreciated that communication of data may also flow back from the backend server 480 to the client computing device, such as in the form of a response to a client computing device's request 490.

As shown in FIG. 4A, a request from a client computing device 490 may be provided to a session listener 472 of the rule enforcement module 470 of the adaptive rule loading and session control engine 410. The adaptive rule loading and session control engine 410 may be provided on a proxy server, a gateway server, a host system, as part of a frontend server, as part of the backend server 480, or the like. In the depicted example, the adaptive rule loading and session control engine 410 is provided on a separate computing device from the backend server 480, such as a proxy server, gateway server, or the like, that operates on client computing device requests prior to them being provided to the backend server 480.

The session listener 472 may be an instantiation of a session listener object associated with the particular session that has been established between the client computing device and the backend server 480. The negotiation and establishment of sessions between client computing devices and servers is generally known in the art and thus, a more detailed description is not provided herein. The session listener 472 may listen for requests from the client computing device and inform the rule engine 460 when a client request 490 has been received. In response, the rule engine 460 may provide the rule enforcement module 470 with the subset of filter sets to be applied to the client request 490. The rule enforcement module 470 may then generate filter servlets 474 to apply the subset of filter sets to the client request 490.

The filter servlets 474 apply their corresponding filter set to the client request 490, including any parameters, inputs, or the like, included in the client request 490, and report results back to the rule engine 460. The filter servlets 474 run as the policy enforcement to process the client computing device requests 490 and the corresponding responses. Multiple servlet filters 474 are deployed to intercept client computing device requests 490 and the resulting responses, implementing a fine grained control. Based on the rule set partitioning mentioned above, each filter servlet 474 is responsible for the control of one of the filter sets that the rule engine 460 determines is applicable to the client computing device request 490.

The rule engine 460 acts an interpreter of the rules from the rule repository 450, i.e. all interpretation of rules from the rule repository 450 occurs within the rule engine 460. The rule repository 450 is dynamically integrated with the rule engine 460 in that the rules in the rule repository 450 that the rule engine 460 determines to apply to a client computing device's session may be dynamically updated in accordance with analysis and decisions made by the analysis and decision module 440 based on reinforcement learning performed by the reinforcement learning module 430. The backend applications/services, e.g., service components 484, are protected by the rule repository 450, rule engine 460, and rule enforcement module 470, which operate together to regulate inputs from client computing devices in their client computing device requests 490.

The rule engine 460, based on the results of the application of the rules in the various filter sets implemented by the filter servlets 474, may report back these results to the environment state information repository 420. For example, as shown in FIG. 4, the rule engine 460 may report back violations of rules in the one or more rule sets implemented by the filter servlets 474 to the environment state information repository 420, such as by storing an entry in the violation report data structure 422.

Assuming that the client request 490 passes all of the rules of the various applicable filter sets applied by the filter servlets 474, the client request 490 is passed to the dispatcher 482 of the backend server 480. The dispatcher 482 dispatches client requests 490 to appropriate service components 484 targeted by the client requests 490. The service components 484 utilize data models 485 to access backend database 487, lightweight directory access protocol (LDAP) database 488, or the like, via the query log mechanisms 486. In processing the client request 490, if a service component 484 generates an exception, e.g., because some input from the client request 490 causes an exception condition, and the exception is handled by the exception handler 483. While only one exception handler 483 is shown in FIG. 4 for simplicity, it should be appreciated that there may be many exception handlers implemented in the backend server 480.

The exception handler 483 is a portion of code that is registered with the backend server 480 as the portion of code to handle a particular type of exception that may be generated by the service components 484. As part of handling the exception, the exception handler 483 stores a log of the exception in the exception report data structure 424 of the environment state information repository 420. The exception report entry generated by the exception handler 483 comprises information for identifying the cause of the exception.

In addition, if an exception is not generated, then the log structures 486, as part of processing the client request 490 using the one or more of the backend database 487 or LDAP data structure 488, the log structures 486 provide access log entries in the access log data structure 428. These access logs provide information regarding accesses performed on the backend database 487 and LDAP data structure 488. These access logs may be used along with the other environment state information in reinforcement learning to adjust the filter sets applied to the client computing device session, or future sessions, for example. Access logs typically record which user accessed which data set in the database 487. Based on an analysis of the access logs performed by the analysis and decision module 440, it can be determined which users accessed which data sets and whether those accesses violated any access rights control, e.g., a user accessed a data set for which the user did not have a required access right. Such unauthorized accessing of a data set may be due to, for example, a SQL injection situation and thus, if it is determined that one or more users are accessing data sets for which they do not have appropriate access rights, rules filter sets for detecting SQL injection may be enabled.

Thus, the environment state information stored in the violation report data structure 422, exception report data structure 424, resource utilization data structure 426, and access log data structure 428, is collected by the rule engine 460, the exception handler 483, and the log module 486 for data access objects in data model module 485. The resource utilization information in the resource utilization data structure 426 may be collected by one or more agents operating in the system for monitoring and collecting such resource utilization information, such as processor usage, memory usage, and the like. The environment state information repository 420 contains the violation reports 422 generated by the rule engine 460, the exceptions 424 thrown from the service components 484 and the data access objects, the query logs 486 of the database 487 and LDAP 488, and also the resource utilization state in the resource utilization data structure 426. For example, if the resource utilization state indicates an adjustment is necessary in the operation of the system, then a session control number or other attributes of the session may be modified to adjust the operation of the system. For example, if it is determined that resource utilization is low and violations are low, then the session control number may be modified to handle more concurrent user requests.

Based on the collected environment state information, the analysis and decision module 440 is designed to gradually revise the rule sets and implements a dynamic loading mechanism for validation rules. In order to balance the security concerns of application/service providers, and response time concerns, the analysis and decision module 440 adjusts the in-line control or off-line monitoring of each filter set, the adaptive rule loading and session control engine 410 implements the dynamic session admission control 442 and rule loading strategy 444 based on the reinforcement learning technique, as implemented by the reinforcement learning module 430, described hereafter.

As mentioned above, the rules in the rule repository 450 are partitioned into multiple filter sets 454. Based on the observation of client computing device request 490 behaviors in each period of time, a rules dynamic loading strategy element 444 denotes which filter set(s) that are enabled, i.e. "turned on," in in-line control mode, a session control strategy element 442 determines the session-based admission control configuration 452, i.e. the session control strategy element 442 determines the admission control number (ACN) indicating the number of concurrent sessions that may be established with the backend server environment.

The filter sets embodiment in the filter servlets 474 contain multiple filter set elements provided as a chain of filter elements, each filter element having attributes including name and class. The adaptive rule loading and session control engine 410 introduces several base filters, such as a whitelist filter, protocol violation filter, XSS filter, command injection filter, outbound leakage filter, integrity filter, and the like.

FIG. 4B is an example diagram illustrating an example implementation of a filter set in accordance with one illustrative embodiment. As shown in FIG. 4B, the Software as a Service (SaaS) Validation filter set comprises a load strategy having certain filters of a filter chain enabled by "<enablefilters>" 481, namely filters f1, f3, and f4 in the filter chain defined by "<filterchain>" 493. This essentially enables the whitelist, XSS, and command injection filter sets of the filter chain 493. In addition, the SaaS Validation filter set has a concurrent session value of "20" as specified by "<concurrentsession>" 492.

Each filter set element contains multiple rule set elements, and a rule set element contains multiple rule elements. A filter set element contains two attributes, the id attribute 494 to indicate the filter to use and the type attribute 495 to define the control type of the filter set, e.g., whitelist, blacklist, etc. A rule element 496 is composed of a name 497, a constraint 498, and an action list element 499. A constraint element 498 is used to define the constraint for the input value to which the rule element 496 is applied. The constraint element 498 can define a regular express constraint, integrity constraint, numerical scale constraint, or string comparison constraint, etc. The constraint element 498 and its value may be extended based on the rule model. The action list element 499 contains a series of action elements to describe how to handle the violation when some input value is inconsistent with the constraint. The action list element 499 contains two attributes, the reason (which could be that a value is malformed, is a command injection, etc.) and the severity (which could be a severity rating of "fatal," "warning," "information," etc.).

In order to balance security risk and system performance cost, each filter for a filter set can be enabled in either in-line mode or off-line mode. Returning to FIG. 4A, the adaptive rule loading and session control engine 410 implements a dynamic inline rule loading mechanism 444 based on the observation of client computing device request 490 behaviors, i.e. the types of violations and/or exceptions generated by client computing device requests 490 during a session or over multiple sessions with regard to the backend applications/services. For the different security levels with different in-line rule sizes, i.e. a number of in-line rules or filter sets that are enabled, the admission control mechanism for a client session can be modeled as a sequential decision problem. For example, as the number of filter sets, and thus the number of rules, that are applied to client computing device sessions are increased, the admission control mechanism may decrease the number of concurrent sessions that are permitted so as to balance security and performance. Similarly, as the number of filter sets decreases, the number of concurrent sessions may be increased.

As mentioned above, the mechanisms of the illustrative embodiments utilize a reinforcement learning (RL) approach, implemented by RL module 430, to dynamically, or adaptively, adjust the rule sets (implemented by the filter servlets 474) that are applied to client computing device requests 490 in the same or different sessions. Based on this RL approach by the RL module 430, the analysis and decision module 440 may determine, for example, whether a violation is detected by a filter servlet 474 in which case the filter set corresponding to the filter servlet should continue to be utilized, whether an exception occurred in the backend server 480 for which there is a filter set that could have detected the violation but was not enabled, whether an exception occurred in the backend server 480 for which there was not a filter set that could have detected the violation.

The case of an exception occurring that could have been detected by an existing filter set that was not enabled, the corresponding filter set may be enabled for subsequent client computing device requests in the same and/or future sessions with the same and/or different client computing devices. In such a case, a corresponding filter servlet 474 may be generated in the rule enforcement module 470 via the rule repository 450 and rule engine 460.

In the case of an exception occurring for which there is no existing filter set that could have detected the violation, the analysis and decision module 440 may automatically generate a filter set based on the exception report 424 information, e.g., by determining what the input was from the client computing device request that caused the exception to be generated and then generating a rule or set of rules that would avoid such an input accessing a portion of code that would generate the exception again in the future. This may involve analyzing the source code of the service component 484 that generated the exception and determining what rule conditions are necessary to detect client computing device request inputs that would cause this portion of code to execute. Such rules may be generated in the rule repository 450 and used to generate a filter set that is implemented by the rule engine 460 and rule enforcement module 470.

Figure 5:
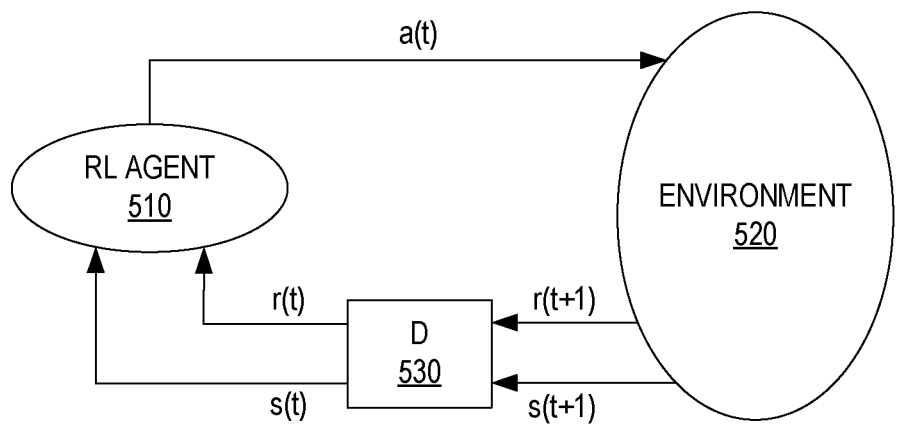
FIG. 5 is an example diagram illustrating a reinforcement learning technique for a general agent and corresponding environment.

In RL, the interaction between an agent, i.e. a section of code which can be used in centralized/distribute environments to read the environment state and output a decision to take an action, such as increase/no change/decrease the session control number, and the environment is modeled as a Markov Decision Process (MDP). The RL technique is generally shown in FIG. 5 for a general agent and corresponding environment. As shown in FIG. 5, an RL agent 510 senses the environment 520 in discrete time steps, for which a decision is made at each time step, and maps the inputs to RL state information $s(t)$. The RL agent 510 executes an action $a(t)$, and then observes the feedback from the environment 520 in the form of positive or negative reward r(t). After performing an action a(t) and receiving a reward r(t+1), the RL agent 510 observes any change in the environment 520 and it updates its policy in order to optimize the reward r(t+1) received for future actions. In the depicted example, the box 530 represents a delay unit 530 of one time slot.

Figure 6B:
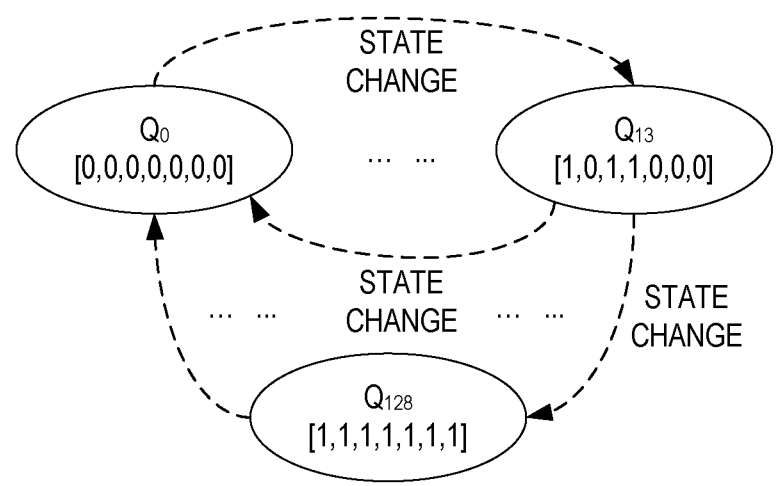
FIG. 6B is an example state diagram illustrating states of filter sets in accordance with one illustrative embodiment.
Figure 6A:
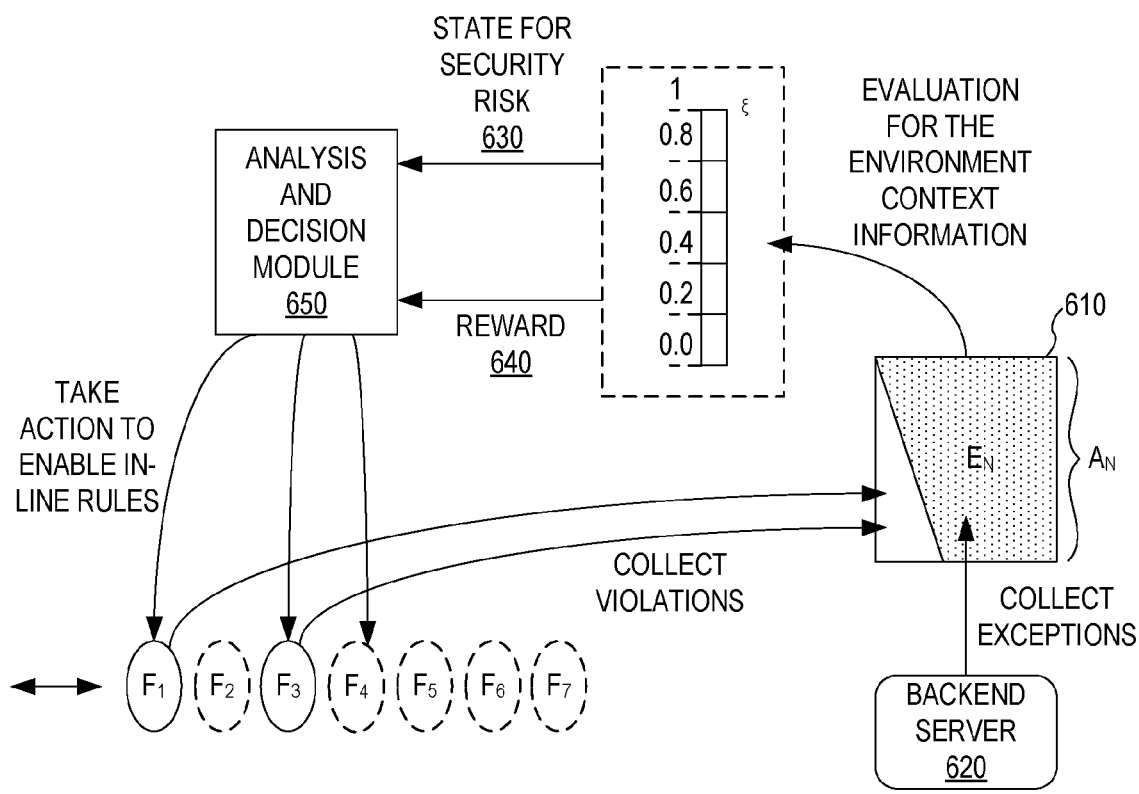
FIG. 6A is an example diagram illustrating an implementation of a reinforcement learning technique in accordance with one illustrative embodiment.

The general RL technique shown in FIG. 5 is implemented in accordance with one illustrative embodiment as shown in FIGS. 6A and 6B. With regard to FIG. 6A, let $A_n$ be the total amount of violations and exceptions which were detected by in-line rules and the backend modules, and $E_n$ in $A_n$ be the amount of exceptions which were not detected by the existing in-line rules but were thrown from the back-end modules. The ratio of security risk is expressed as $\xi=E_n/A_n$. The range of possible ratios of security risk [0, 1] is divided into m≥1 intervals with the current state of the environment being $s_1$ if there is $\xi \in [i-1/m, i/m]$. In the depicted example, the range [0, 1] is divided into 5 intervals of 0 to 0.2, 0.2 to 0.4, 0.4 to 0.6, 0.6 to 0.8, and 0.8 to 1.0. Thus. $S=\{s_i\}$, i=1, 2, ..., m is the environment state set of the analysis and decision module 440.

For the analysis and decision module 440, the actions performed by the analysis and decision module 440 are interpreted as the incremental changes to select the different filter sets and then enable the different in-line rules. $A=\{(f_1, f_2, \ldots, f_n)|f_{i=1, 2, \ldots, n} \in \{0, 1\}$ represent the control mode of the filter set as turning off and turning on, respectively. In a predefined time period, the utility of the backend server is defined as $r(t)=\mu \log(1-\xi)$ where $\xi$ is defined as mentioned above and $\mu$ is a positive parameter that represents the degree of dissatisfaction with security risk.

Thus, using this model, the percentage of exceptions in the total violations and exceptions 610 generated by the backend server 620 is used as a basis for selecting a ratio range interval, referred to as a state for the security risk 630. The state for the security risk 630 is used to identify a corresponding reward 640 for the security risk, based on the reward definition noted above. The reward 640 and state for the security risk 630 are provided to the analysis and decision module 650. The analysis and decision module 650 then performs an action to enable or disable in-line rules of filter sets based on the state for the security risk 630 and reward 640.

There are different approaches to calculate the optimal policy and to maximize the rewards obtained over time. One technique is the Q-learning technique which uses a recursive algorithm to estimate a value function. The algorithm forms a Q table in which rows are states and columns are actions. An agent in each state s chooses an action a, observes the reward r and goes to the next state s'. It then updates the estimated Q value as follows:

$$Q(s, a) \leftarrow (1-\beta)Q(s, a) + \beta[r + \gamma \max_{a'} Q(s', a')]$$

where $\gamma \in [0, 1]$ is a discounting factor that discriminates the impact of reinforcements that are farther away, and $\beta \in [0, 1]$ indicates the learning rate.

With the mechanisms of the illustrative embodiments, each filter set is set up so that it has two states, 0—normal and 1—abnormal, such as shown in the state diagram of FIG. 6B. When a violation is detected for a client computing device request based on a filter set, the filter set is set to an abnormal state. At each discrete time step, the combination of all states of the filter sets represents the global state of the client computing device requests. In one example implementation, in which there are 7 possible filter sets that may be enabled and thus, may be in a normal or abnormal state, the global state of the computing device requests may be changed among 128 states, as shown in FIG. 6B. For example, a state [1,0,1,1,0, 0,0] represents an abnormal request state where a whitelist is malformed, and an XSS and command injection violation are detected at one time step. Thus, the state s(t) of an environment may be represented as the vector value having values representing either a normal or abnormal state of each of the corresponding possibly enabled filter sets. If a filter set is not enabled during the time step, then its state is normal and cannot be changed to abnormal since it is not able to evaluate a violation or exception.

With different inline validation rule sizes, the session admission control module has three actions, i.e. negative change, no change, or positive change $\{-\Delta, 0, +\Delta\}$, and selects an action to adjust the filter sets to be applied by the environment 520. For example, $\Delta$ may be set to 2 such that, based on the change in the filter sets applied.

It is not simple to define a reasonable utility function representing the reward r at each discrete time. To overcome this problem, the illustrative embodiments use the concept of utility to represent the degree of satisfaction of a server given certain computational resources. For example, a utility function of the following type may be utilized:

$$r(t)=\mu \log(1-C_u(t)/C_a)+\phi^*N(t)$$

In this equation, the first term represents the server's empirical loss for consumed resources and the second term represents the revenue for completing user's sessions within a predefined response time constraint. To simplify the evaluation, it is assumed that there are N(t) concurrent sessions, in time slot t, and each session will send multiple requests without think time. If all the requests from one session are fulfilled within the response time constraint (for example, 150 milliseconds), then this session is defined as a completed session and a maximal revenue $\phi=1$ is obtained, otherwise the corresponding revenue will be discounted.

For the log function, the empirical loss $\mu \log(1-C_u(t)/C_a)$ increases relatively slowly from zero at the beginning but rapidly later, which reflects the natural judgment of a server that the system is heavily loaded with performance getting worse and worse. The parameter $\mu$ in the equation is a positive parameter that represents the degree of dissatisfaction about resource exhaustion. The parameter $\mu$ may be predefined and set for the particular backend application/service provider. Thus, there may be a different $\mu$ value for different backend application/service providers using the same or different backend server. The parameter $C_a$ represent the total amount of computation resources in the server, and the parameter $C_u(t)$ represents the usage of computation resources of the server in time slot t.

With such a reward function as defined above, the analysis and decision module 440 may determine which filter sets to enable/disable so as to maximize the reward indicated by the reward function. For example, a gradual optimization process may be used in which, for each different environment state at each discrete time slot, a calculation of the instant reward value may be made to know whether or not the action taken last time was correct or not. If the accumulated value of the reward of each of the time slots has an increasing trend, then it is determined that the action taken previously was correct. In this way, it can be learned which kind of action should be taken under different environment conditions. The accumulated reward will achieve an optimized value gradually using this approach.

For a system with a large state space, it is too expensive to randomly explore all possible states of environmental conditions. In one illustrative embodiment of the adaptive rule loading and session control engine 410, an exploration method is used based on the Bolrzmann distribution, which starts with high exploration and decreases it as time goes on. Finally, the state transitions (s, a) that have worked out reasonably well before may be explored, and thereby learn the optimal policy for adjusting the admission control of sessions gradually to obtain the maximal return expected.

Figure 7:
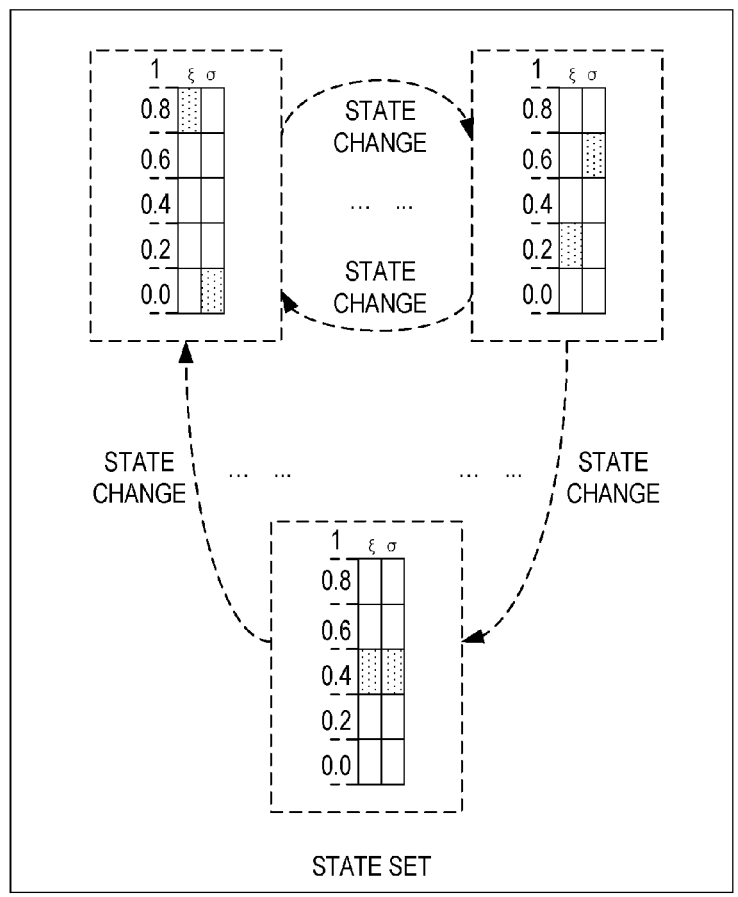
FIG. 7 illustrates an extension of the reinforcement learning technique of FIG. 6 to accommodate session-based admission control in accordance with one illustrative embodiment.
Figure 7:
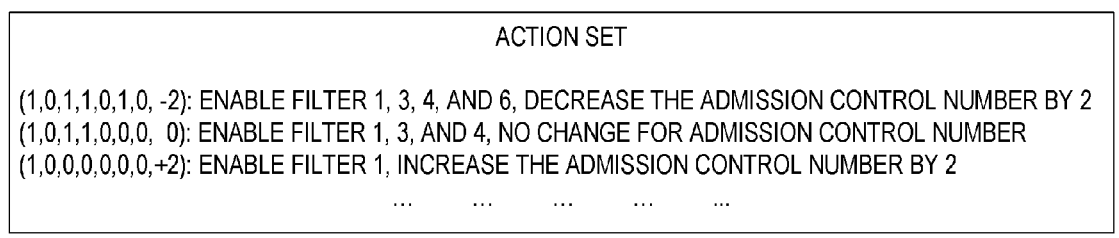

The illustrative embodiments of the present invention further provide an extension to the above MDP model based RI, technique to enable session-based admission control. FIG. 7 illustrates this extension to accommodate session-based admission control in accordance with one illustrative embodiment. As shown in FIG. 7, let Ca be the total computation resources in the backend server and Cu(t) be the usage of computation resources in a time slot t. Then, the ratio of resource usage is given by $\sigma=Cu(t)/Ca$. Again, the range of possible values of a is divided into $m \geq 1$ intervals with the current state of the environment being $s_{ij}$ if there is $\sigma \in [i-1/m, i/m]$ and $\xi \in [j-1/m, i/m]$. Thus, the environment state set of the analysis and decision module 440 is $S=\{s_{ij}\}_{i=1,2,\ldots m; j=1,2,\ldots m}$.

For the analysis and decision module 440, its actions are the incremental changes to select the different filters as the in-line control mode and adjust the access control number (ACN). The action set of the analysis and decision module 440 is $A=\{(f_1, f_2, \ldots, f_n, s) | f_1=1, 2, \ldots, n \in \{0,1\}, s \in \{-\Delta, 0, +\Delta\}\}$, where $f_i \in \{0, 1\}$ represents the control mode of the filter set as turning off and turning on, respectively, and $s \in \{-\Delta, 0, +\Delta\}$ represents the adjustment on access control number.

Under this extended model, in a predetermined time period, the utility of the backend server is defined using the values $\xi$ and $\sigma$, as defined above, using the equation:

$$r(t)=\mu_1 \log(1-\xi)+\mu_2 \log(1-\sigma)+\phi^* N(t)$$

The first term represents the security risk of the backend server. The second term represents the backend server's empirical loss for consumed resources. The third term represents the revenue for completing sessions within a predefined response time constraint. The values $\mu_1$ and $\mu_2$ are positive parameters that represent the degree of dissatisfaction about security risk and resource exhaustion, respectively. As with the previous embodiment described above, $\mu_1$ and $\mu_2$ may be predefined values set for the particular backend application/service provider. Moreover, in a similar manner as described above, this reward function is used as a basis for dynamically adjusting the filter sets enabled/disabled so as to maximize the reward.

The operation of the analysis and decision module 440, turning on/off different filter sets, storing of violation reports, capturing of exceptions, and performing of the RL technique may all be performed as off-line processes. The in-line processes involve obtaining client computing requests and their corresponding responses, performing session admission control on the requests/responses, validating the requests/responses by in-line filter sets, i.e. filter sets that are turned on, and processing the requests/responses in the backend server. The off-line processes may be performed for example, during a testing mode of the adaptive rule loading and session control engine. For example, the adaptive rule loading and session control engine may be set to an active mode or a testing mode of operation such that during testing mode of operation, sample client requests may be submitted to the adaptive rule loading and session control engine to train the engine using the RL technique. Such testing mode operation can be performed periodically at a regularly scheduled time, in response to a determination that an adjustment of the operation of the engine needs to be made, or the like. Once trained, the engine may be placed in an active mode of operation and may then handle actual client computing device requests and responses. During active mode of operation, the engine may still operate with continued dynamic adjustment of filter sets in accordance with the description above or may disable such dynamic adjustment in favor of period test mode adjustments.

Alternatively, the mechanisms of the illustrative embodiments may utilize a shadow system in which actual client requests and responses may also be submitted to a shadow system in which a different configuration of filter sets is provided so as to determine what the performance of the actual system would be with a different filter set configuration. This information can then be used to determine how to modify the set of enabled/disabled filter sets in the actual system during the analysis and decision making made by the analysis and decision module.

Thus, the illustrative embodiments provide mechanisms for adaptive rule loading and session control based on a balancing of security risks with performance of the backend applications/services. With the mechanisms of the illustrative embodiments, security rules are partitioned into filter sets designed to address different types of attacks to the backend applications/services. These various filter sets may be adaptively and dynamically enabled/disabled in accordance with a balance of concerns regarding security and performance. Such balancing can be performed dynamically based on detected violations, exceptions, and resource utilization information, for example. The mechanisms of the illustrative embodiments may utilize reinforcement learning to determine how to adjust the filter sets applied to requests/responses of client computing sessions as well as to perform session control by adjusting the number of concurrent sessions.

Figure 8:
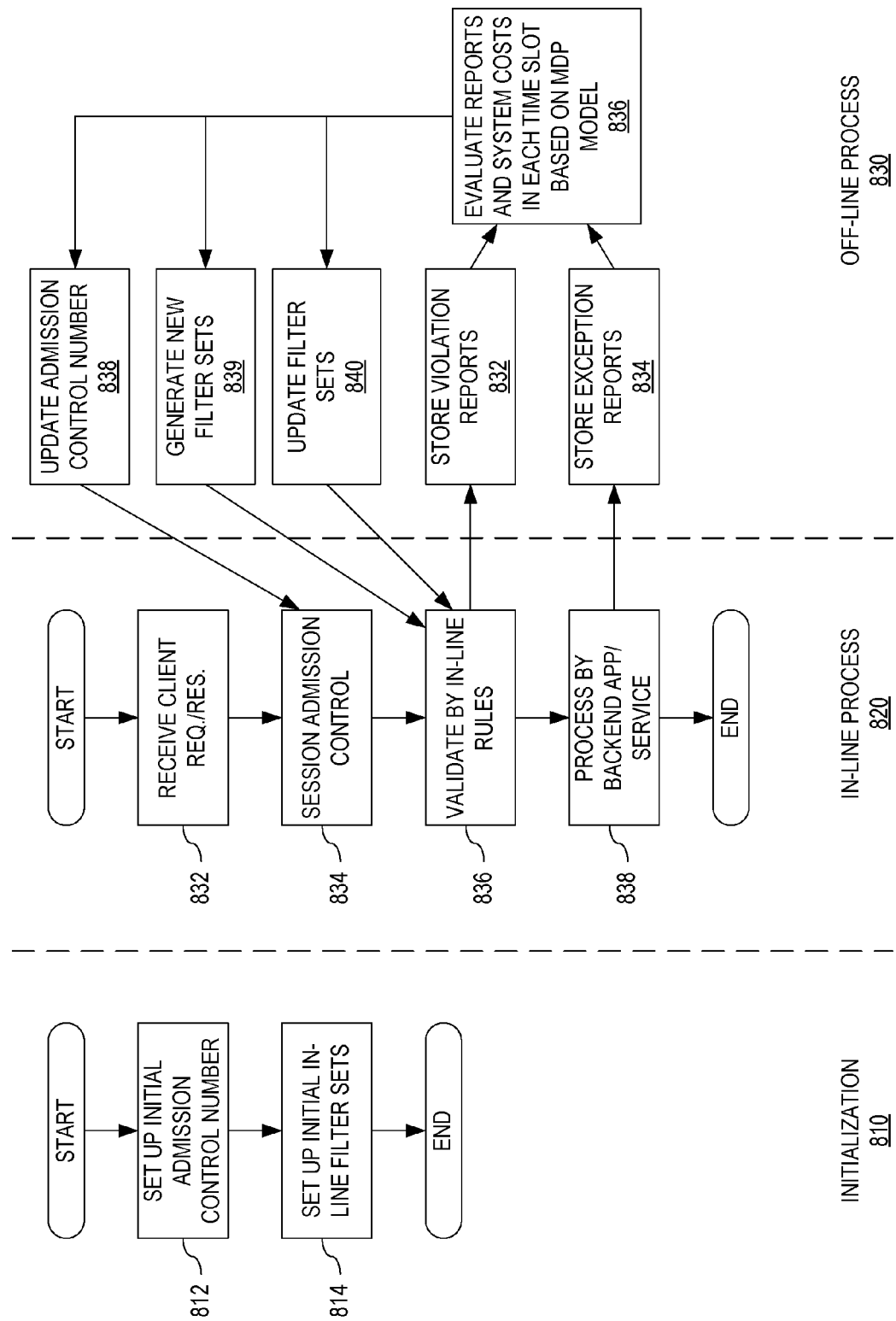
FIG. 8 is a flowchart outlining an example operation of an adaptive rule loading and session control engine in accordance with one illustrative embodiment.

FIG. 8 is a flowchart outlining an example operation of an adaptive rule loading and session control engine in accordance with one illustrative embodiment. As shown in FIG. 8, during an initialization process 810, which may occur at initialization of a backend application/service, for example, an initial admission control number is set (step 812) and an initial set of filter sets is setup (step 814). The initialization process 810 then ends.

During an in-line process 820, a client computing device request/response is received (step 822) and session admission control is performed on the client computing device request/response (step 824). Such session admission control involves performing various actions to determine if there are sufficient resources available to accept the session connection associated with the request/response. In the illustrative embodiments, the number of concurrent sessions that may be established with a backend server may be dynamically updated as the filter sets are dynamically enabled/disabled, so as to balance security concerns with performance concerns. Thus, as part of the session admission control, a determination may be made as to whether there are currently any session connections available based on a number of current sessions and an admission control number that is set by the mechanisms of the illustrative embodiments indicating the number of concurrent sessions that are permitted.

Assuming that the request/response passes the session admission control, the request/response is validated by the in-line rules of the enabled filter sets (step 826). If the request/response passes the validation by the in-line rules, the request/response is processed by the backend applications/services (step 828) and the operation terminates.

As part of the validation in step 826, one or more in-line rules may indicate that the request/response violates a constraint of the one or more in-line rules. As a result, and as part of an off-line process 830, the violations will be stored in a violations report data structure (step 832). Moreover, as part of the processing of the request by the backend applications/services, the applications/services may generate exceptions due to inputs from the request/response violating some requirement of the applications/services. In such a case, the exceptions are captured in an exception report data structure (step 834). The violations and exceptions may be evaluated along with system costs to determine adjustments to the filter sets that are enabled/disabled for client computer sessions as well as to determine adjustments to the admission control number (step 836). As described in detail above, such evaluation may involve using an MDP model and reinforcement learning technique for balancing rewards versus costs for security and performance considerations. The results of the evaluation are communicated as updates to the admission control number (step 838) and enabled/disabled filter sets (step 840), back to the session admission control performed in step 824 and validation performed in step 826. Moreover, the results of the evaluation may be used to generate new rules/filter sets (step 839), in the event that there are no other existing filter sets that can be turned on to address the cause of an exception. As discussed previously, the generation of a new rule/filter set may involve analyzing and evaluating the reports of the exceptions provided in step 834, and using the identification of the exception, the input causing the exception, and the like, to automatically generate a new rule/filter set, e.g., generating a new rule/filter set having a predicate condition that is the input that caused the exception with a result being a violation being generated that corresponds to the exception that was detected. This new rule/filter set may be enabled for in-line validation such that the corresponding input will generate a violation and will not be passed to the backend applications/services in the future.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for handling client computing device requests, comprising:

partitioning a set of rules, stored in a storage device of the data processing system, into a plurality of filter sets, wherein each filter set comprises a different subset of the set of rules and is directed to identifying a different type of attack on a backend application or backend service;

selecting, by a processor of the data processing system, one or more filter sets, in the plurality of filter sets, to be used to validate client computing device requests received from client computing devices, wherein the one or more filter sets is less than a total number of the filter sets in the plurality of filter sets;

applying, by the processor, the one or more selected filter sets to at least one client computing device request or at least one response to a client computing device request; and dynamically modifying, by the processor, which filter sets of the plurality of filter sets that are included in the one or more selected filter sets, based on an adaptive reinforcement learning operation on results of applying the one or more selected filter sets to at least one client computing device request or at least one response to a client computing device request, wherein dynamically modifying which filter sets of the plurality of filters sets that are included in the one or more selected filter sets further comprises performing the adaptive reinforcement learning operation based on detected violations of rules in the one or more selected filter sets and exceptions thrown by the backend application or backend service in response to client computing device requests that passed the one or more selected filter sets, and wherein the adaptive reinforcement learning comprises:

generating a security risk value based on a ratio of a number of exceptions thrown by the backend application or backend service to a total of the number of exceptions thrown and detected violations, identifying a corresponding reward value for the security risk value; and enabling or disabling rule sets in the plurality of rule sets to thereby select or de-select rules sets in the one or more selected rule sets based on the security risk value and corresponding reward value.

2. The method of claim 1, wherein each filter set, in the plurality of filter sets is able to be individually enabled and disabled for use as part of an in-line control mode of operation based on analysis of requests received from the client computing device.

3. The method of claim 1, wherein dynamically modifying which filter sets of the plurality of filters sets that are included in the one or more selected filter sets further comprises performing the adaptive reinforcement learning operation based on access log information identifying which users accessed which data sets stored in a data storage device of the data processing system.

4. The method of claim 1, wherein performing the adaptive reinforcement learning operation comprises:

analyzing violations, caused by client computing device requests, identified by the one or more selected filter sets and utilizing the violations as positive feedback in the adaptive reinforcement learning operation; and analyzing exceptions thrown by the backend application or backend service and utilizing the exceptions as negative feedback in the adaptive reinforcement learning operation.

5. The method of claim 1, wherein dynamically modifying which filter sets of the plurality of filter sets that are included in the one or more selected filter sets comprises:

determining if a filter set exists, in the plurality of filter sets, for handling conditions causing the exception to be thrown; and enabling the filter set for handling the conditions causing the exception to be thrown in response to a determination that the filter set exists in the plurality of filter sets.

6. The method of claim 5, further comprising:

automatically generating a filter set to handle the conditions causing the exception to be thrown in response to a determination that a filter set for handling the conditions causing the exception to be thrown does not exist in the plurality of filter sets.

7. A computer program product comprising a computer recordable storage device having a computer readable program recorded thereon, wherein the computer readable program, when executed on a computing device, causes the computing device to:

partition a set of rules into a plurality of filter sets, wherein each filter set comprises a different subset of the set of rules and is directed to identifying a different type of attack on a backend application or backend service;

select one or more filter sets, in the plurality of filter sets, to be used to validate client computing device requests received from client computing devices, wherein the one or more filter sets is less than a total number of the filter sets in the plurality of filter sets;

apply the one or more selected filter sets to at least one client computing device request or at least one response to a client computing device request; and dynamically modify which filter sets of the plurality of filter sets that are included in the one or more selected filter sets, based on an adaptive reinforcement learning operation on results of applying the one or more selected filter sets to at least one client computing device request or at least one response to a client computing device request, wherein the computer readable program further causes the computing device to dynamically modify which filter sets of the plurality of filters sets that are included in the one or more selected filter sets at least by performing the adaptive reinforcement learning operation based on detected violations of rules in the one or more selected filter sets and exceptions thrown by the backend application or backend service in response to client computing device requests that passed the one or more selected filter sets, and wherein the adaptive reinforcement learning comprises:

generating a security risk value based on a ratio of a number of exceptions thrown by the backend application or backend service to a total of the number of exceptions thrown and detected violations;

identifying a corresponding reward value for the security risk value; and enabling or disabling rule sets in the plurality of rule sets to thereby select or de-select rules sets in the one or more selected rule sets based on the security risk value and corresponding reward value.

8. The computer program product of claim 7, wherein each filter set, in the plurality of filter sets is able to be individually enabled and disabled for use as part of an in-line control mode of operation based on analysis of requests received from the client computing device.

9. The computer program product of claim 7, wherein the computer readable program causes the computing device to dynamically modify which filter sets of the plurality of filters sets that are included in the one or more selected filter sets further by performing the adaptive reinforcement learning operation based on access log information identifying which users accessed which data sets stored in a data storage device of the data processing system.

10. The computer program product of claim 7, wherein the computer readable program causes the computing device to perform the adaptive reinforcement learning operation by:

analyzing violations, caused by client computing device requests, identified by the one or more selected filter sets and utilizing the violations as positive feedback in the adaptive reinforcement learning operation; and analyzing exceptions thrown by the backend application or backend service and utilizing the exceptions as negative feedback in the adaptive reinforcement learning operation.

11. The computer program product of claim 7, wherein the computer readable program causes the computing device to dynamically modify which filter sets of the plurality of filter sets that are included in the one or more selected filter sets by:

determining if a filter set exists, in the plurality of filter sets, for handling conditions causing the exception to be thrown; and enabling the filter set for handling the conditions causing the exception to be thrown in response to a determination that the filter set exists in the plurality of filter sets.

12. The computer program product of claim 11, wherein the computer readable program further causes the computing device to:

automatically generate a filter set to handle the conditions causing the exception to be thrown in response to a determination that a filter set for handling the conditions causing the exception to be thrown does not exist in the plurality of filter sets.

13. An apparatus, comprising:

a processor; and a memory coupled to the processor, wherein the memory comprises instructions which, when executed by the processor, cause the processor to:

partition a set of rules into a plurality of filter sets, wherein each filter set comprises a different subset of the set of rules and is directed to identifying a different type of attack on a backend application or backend service;

select one or more filter sets, in the plurality of filter sets, to be used to validate client computing device requests received from client computing devices, wherein the one or more filter sets is less than a total number of the filter sets in the plurality of filter sets;

apply the one or more selected filter sets to at least one client computing device request or at least one response to a client computing device request; and dynamically modify which filter sets of the plurality of filter sets that are included in the one or more selected filter sets, based on an adaptive reinforcement learning operation on results of applying the one or more selected filter sets to at least one client computing device request or at least one response to a client computing device request, wherein the instructions further cause the processor to dynamically modify which filter sets of the plurality of filters sets that are included in the one or more selected filter sets at least by performing the adaptive reinforcement learning operation based on detected violations of rules in the one or more selected filter sets and exceptions thrown by the backend application or backend service in response to client computing device requests that passed the one or more selected filter sets, and wherein the adaptive reinforcement learning comprises:

generating a security risk value based on a ratio of a number of exceptions thrown by the backend application or backend service to a total of the number of exceptions thrown and detected violations, identifying a corresponding reward value for the security risk value; and enabling or disabling rule sets in the plurality of rule sets to thereby select or de-select rules sets in the one or more selected rule sets based on the security risk value and corresponding reward value.

* * * * *